United States Patent
Sinor

(10) Patent No.: US 6,722,315 B2
(45) Date of Patent: Apr. 20, 2004

(54) SELF-STORING WALL-MOUNTED PET ENCLOSURE

(76) Inventor: Ron L. Sinor, 438 Cedar Hills Rd., Midway, AR (US) 72651

(*) Notice: Subject to any disclaimer, the term of this patent is extended or adjusted under 35 U.S.C. 154(b) by 0 days.

(21) Appl. No.: 10/115,663

(22) Filed: Apr. 4, 2002

(65) Prior Publication Data

US 2002/0144659 A1 Oct. 10, 2002

Related U.S. Application Data

(60) Provisional application No. 60/281,892, filed on Apr. 6, 2001.

(51) Int. Cl.[7] .......................... A01K 1/03; A01K 1/035; A01K 31/06
(52) U.S. Cl. ...................... 119/484; 119/474; 119/499; 220/476; 220/478
(58) Field of Search .................. 119/484, 491, 119/474, 498, 431, 461, 492, 499; 220/6, 476–481

(56) References Cited

U.S. PATENT DOCUMENTS

| | | | | |
|---|---|---|---|---|
| 1,425,587 A | * | 8/1922 | Hammond et al. ............. | 220/6 |
| 1,673,769 A | * | 6/1928 | Graham .......................... | 220/6 |
| 2,456,479 A | * | 12/1948 | Antil .............................. | 220/6 |
| 3,337,078 A | * | 8/1967 | Radek ............................. | 220/6 |
| 4,291,645 A | * | 9/1981 | Cruchelow et al. ......... | 119/484 |
| 4,455,459 A | * | 6/1984 | Smith .......................... | 200/5 R |
| 4,763,606 A | * | 8/1988 | Ondrasik, II ................ | 119/474 |
| 4,917,047 A | * | 4/1990 | Wazeter, III ................ | 119/474 |
| 5,267,688 A | * | 12/1993 | Benefield ...................... | 232/17 |
| 5,522,344 A | * | 6/1996 | Demurjian ................... | 119/474 |
| 5,782,205 A | * | 7/1998 | Veras .......................... | 119/484 |
| 6,029,609 A | * | 2/2000 | Bahar et al. ................ | 119/474 |
| 6,253,711 B1 | * | 7/2001 | Shibles ........................ | 119/484 |
| 6,394,035 B1 | * | 5/2002 | Hill ............................. | 119/484 |
| 6,408,797 B2 | * | 6/2002 | Pivonka et al. ............. | 119/498 |

FOREIGN PATENT DOCUMENTS

| GB | 2238296 A | * | 5/1991 | ............ A01K/1/02 |
|---|---|---|---|---|

* cited by examiner

Primary Examiner—Michael J. Carone
Assistant Examiner—James S. Bergin
(74) Attorney, Agent, or Firm—Keith J. Brodie

(57) ABSTRACT

The invention is a self-storing pet enclosure intended for use on a mounting wall outside of a pet door or window. In the stowed configuration, the enclosure is substantially flush with the mounting wall, making it well-suited for applications such as a recreational vehicle, travel trailer, tent trailer, or mobile home. In the deployed configuration, it provides at-will access for a pet to the enclosure, which, in one embodiment, is constructed primarily with wire-mesh panels. This gives the pet access to a well-ventilated, essentially outdoor area. The self-storing feature obviates the need for any additional storage space to keep the enclosure when not in use. The methods of deploying and stowing are simple and do not require any tools or complicated procedures, making the invention easily to use.

10 Claims, 5 Drawing Sheets

US 6,722,315 B2

SELF-STORING WALL-MOUNTED PET ENCLOSURE

CROSS-REFERENCE TO RELATED APPLICATIONS

This application claims the benefit of provisional application No. 60/281,892 filed Apr. 6, 2001.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

REFERENCE TO A MICROFICHE APPENDIX

Not Applicable

BACKGROUND OF THE INVENTION

1. Field of the Invention

The invention is generally related to the field of collapsible pet enclosures or cages. More specifically, the invention is related to the field of pet enclosures suitable for mounting on a wall outside a window or pet door. The invention is also related to the field of pet enclosures suitable for use with a mobile home, recreational vehicle, travel trailer or tent trailer.

2. Description of the Related Art

There are existing examples of pet enclosures adapted for use with a recreational vehicle or travel trailer. The commercially available Pet Patio™ product is a collapsible enclosure mounted on removable legs and secured to the side of a recreational vehicle next to a pet door. This product is stowed for travel by removing the legs, collapsing the structure, and stowing it someplace in the vehicle for travel. It requires the use of some storage space in the vehicle, and is not self-storing.

There are other examples of enclosures, though not necessarily for pets, for recreational vehicles or travel trailers in the prior art. For example, U.S. Pat. No. 4,874,197 by Grable, discloses a retractable porch for a trailer, mobile home, or recreational vehicle. This reference describes one embodiment that has the porch collapsing against the wall of the RV for travel.

There are other examples of collapsible enclosures, including U.S. Pat. No. 5,010,848 by Rankin, which discloses a folding travel cage in which the sides fold in an accordion-like manner and U.S. Pat. No. 5,626,098 by Askins, which discloses a collapsible cage with a folding mechanism.

There are also examples of pet enclosure positioned so the pet has access to the enclosure at will, for example, U.S. Pat. No. 5,261,350 by Vavrek discloses a pet enclosure attached to a dwelling with access through a pet door. The enclosure, however, is not collapsible or suitable for travel.

It can be seen then that there is a need in the prior art for a self-storing pet enclosure providing at will access to the enclosed area.

BRIEF SUMMARY OF THE INVENTION

To minimize the limitations in the prior art, and to minimize other limitations that will become apparent upon reading and understanding the present specification, the present invention discloses a self-storing pet enclosure suitable for mounting outside a pet door or window. In the deployed configuration, it provides at-will access for a pet to the enclosure, which, in one embodiment, is constructed primarily with wire-mesh panels. This gives the pet access to a well-ventilated, essentially outdoor area.

The self-storing feature obviates the need for any additional storage space to keep the enclosure when not in use. The methods of deploying and stowing are simple and do not require any tools or complicated procedures, making the invention easily to use.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

The invention has two configurations in which it is intended to operate, deployed and stowed. In the deployed configuration, the invention encloses a volume adjacent to a mounting wall. In the stowed configuration, the enclosure is collapsed to be substantially flush with the mounting wall. There is a sequence of steps, forming intermediate configurations, required to move from the deployed to stowed configuration and vice-versa.

Figure 1:
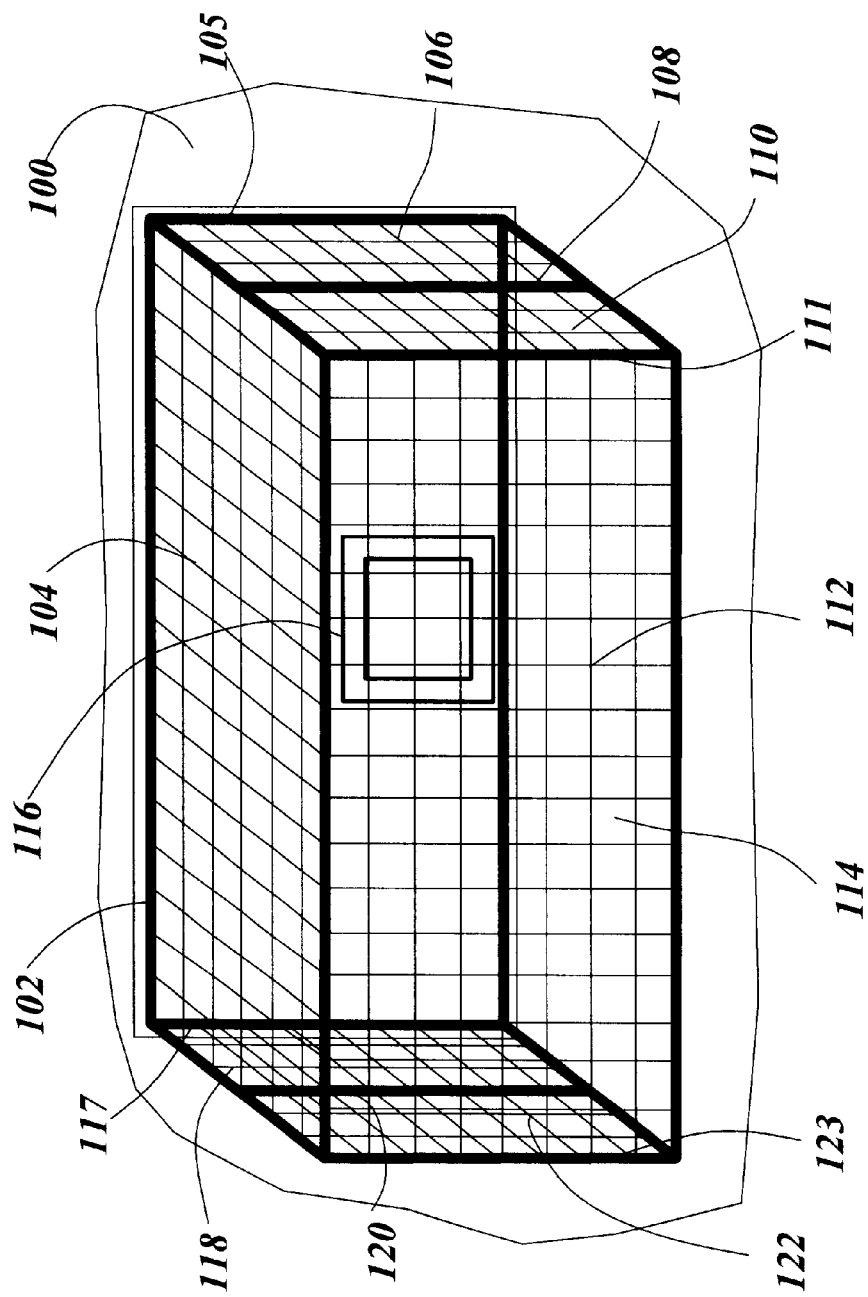
FIG. 1 is a perspective view of the invention in the deployed configuration.

Referring to FIG. 1, the enclosed volume in the deployed configuration is defined by the mounting wall (100) and five panels; a floor panel (114), a roof panel (104), an outer panel (112), and left (118, 120, 122) and right (106, 108, 110) accordion side panels. Each accordion side panel is foldable, in accordion fashion, along a vertical hinge line. The left accordion side panel includes a left outer sub-panel (122), a left inner sub-panel (118), and a left-side vertical hinge (120) Similarly, the right accordion side panel includes a right outer sub-panel (110), a right inner sub-panel (106), and a right-side vertical hinge (108).

The entire invention is secured to the wall with the mounting frame (102). In the preferred embodiment the mounting frame is attached to the mounting wall with numerous screws. Other methods of attachment, including nails, welding, and riveting, will be obvious to one skilled in the art.

The roof panel (104) is connected to the mounting frame (102) with a hinge (302) running horizontally along the inner edge of the roof panel and upper edge of the mounting frame. Similarly, the floor panel (114) is connected to the mounting frame (102) with a hinge (300) running horizontally along the inner edge of the floor panel and the lower edge of the mounting frame. The inner sub-panel (118) of the left accordion side panel is attached to the mounting frame (102) with a hinge (117) running vertically along the left edge of the mounting frame. The inner sub-panel (106) of the right accordion side panel is also attached to the mounting frame (102) with a hinge (105) running vertically along the right edge of the mounting frame.

The outer panel (112) is not directly connected to the mounting frame (102), the roof panel (104), or the floor panel (114). It is connected along each side edge to the accordion side panels. The outer sub-panel (122) of the left accordion side panel is connected to the outer panel (112) with a hinge (123) running vertically along the left edge of the outer panel. The outer sub-panel (110) of the right accordion side panel is connected to the outer panel (112) with a hinge (111) running vertically along the right edge of the outer panel.

In the preferred embodiment of the invention, the left and right side inner and outer sub-panels (118, 122, 106, 110), the roof panel (104), and the outer panel (112) are of steel wire-frame construction and the floor panel (114) is of steel sheet metal construction. This provides a ventilated enclosure or cage with a solid surface for a pet to walk on. Other panel construction possibilities include various combinations of solid and wire-frame construction and other materials such as fiberglass, wood and plastic. Other methods of constructing panels will be obvious to one skilled in the art. Panel construction need not be of the same materials for the entire enclosure. The roof panel, for example, could be made of a solid opaque plastic sheet to provide shade, the left and right accordion side panels and the outer panel made of wire-frame construction to provide a ventilated enclosure, and the floor panel made of fiberglass. These alternative panel materials and construction methods are within the scope of the invention.

The deployed configuration can be used for many purposes, including a pet enclosure, a storage area, and a room extension for the object it is mounted on. In the preferred embodiment of the invention, it is used as a pet enclosure, where the pet has access to the enclosure at will through a pet door (116). In this embodiment, the mounting frame (102) of the invention is positioned to enclose the pet door. In other embodiments, the mounting frame can be positioned over a window, door, or any other aperture into the space on the other side of the mounting wall.

Figure 2:
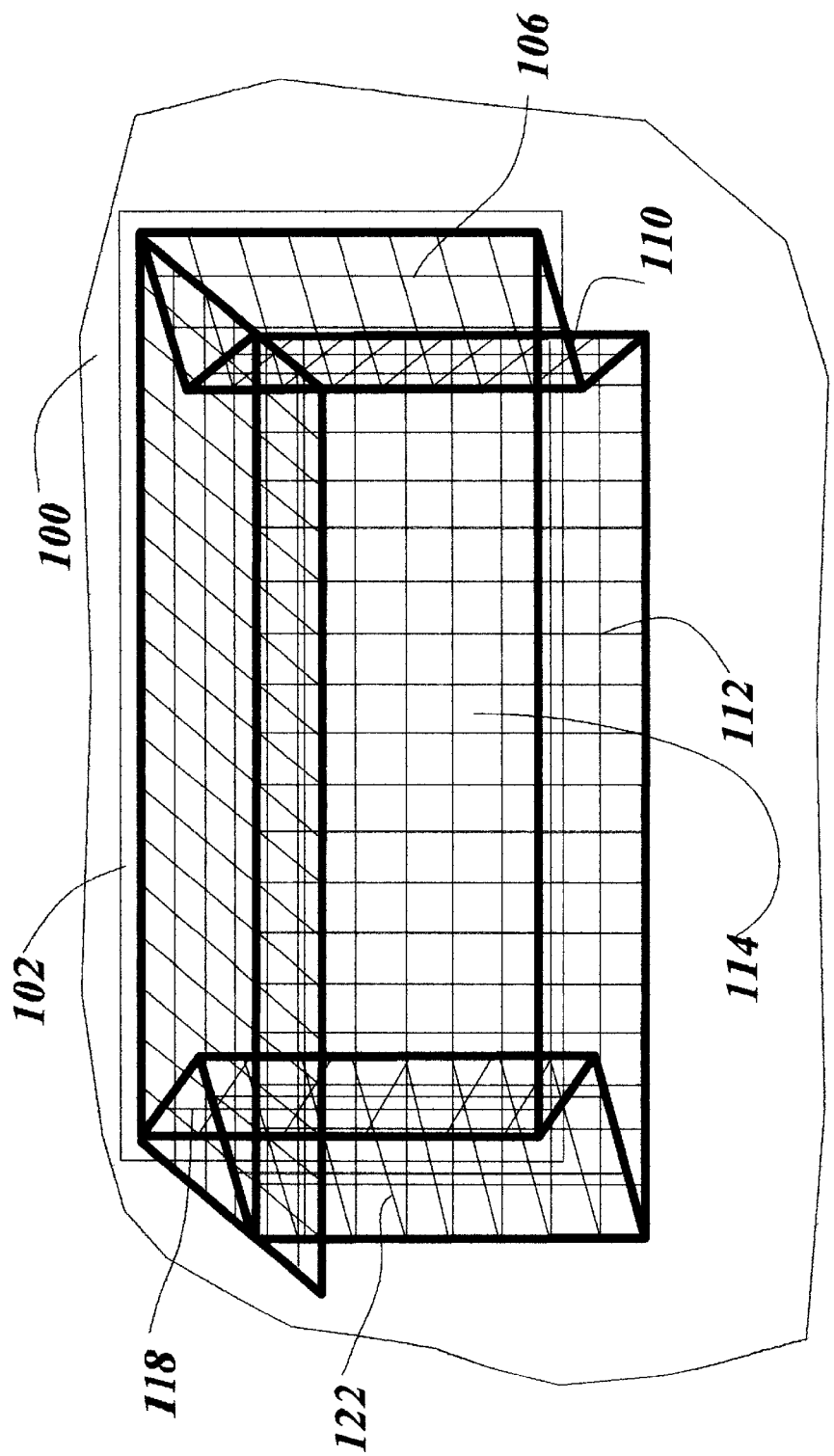
FIG. 2 is a perspective view of the invention in a partially stowed configuration.

The invention is self-storing, a significant advantage over the prior art. The mechanism for storing the enclosure is illustrated in part with FIG. 2. In FIG. 2 the floor panel (114) has been rotated up, covering the pet door (116) shown in FIG. 1, such that it is no longer visible in FIG. 2. With the floor panel now rotated up substantially flush to the mounting wall (100), the outer panel (112) has been pushed part of the way in towards the mounting wall (100). This has caused partial folding the left and right accordion side panels so that the left inner (118) and outer (122) sub-panels are now part way folded together and no longer coplanar. Similarly, the right inner (106) and outer (110) sub-panels are partially folded together and no longer coplanar in FIG. 2. FIG. 2 is a transitional configuration, neither fully-deployed or fully-stowed. To proceed from the transitional configuration shown in FIG. 2 to the stowed configuration; the outer panel (112) is pushed in as far as it will go, and the roof panel (104) is rotated down over the outside of the outer panel.

Figure 3:
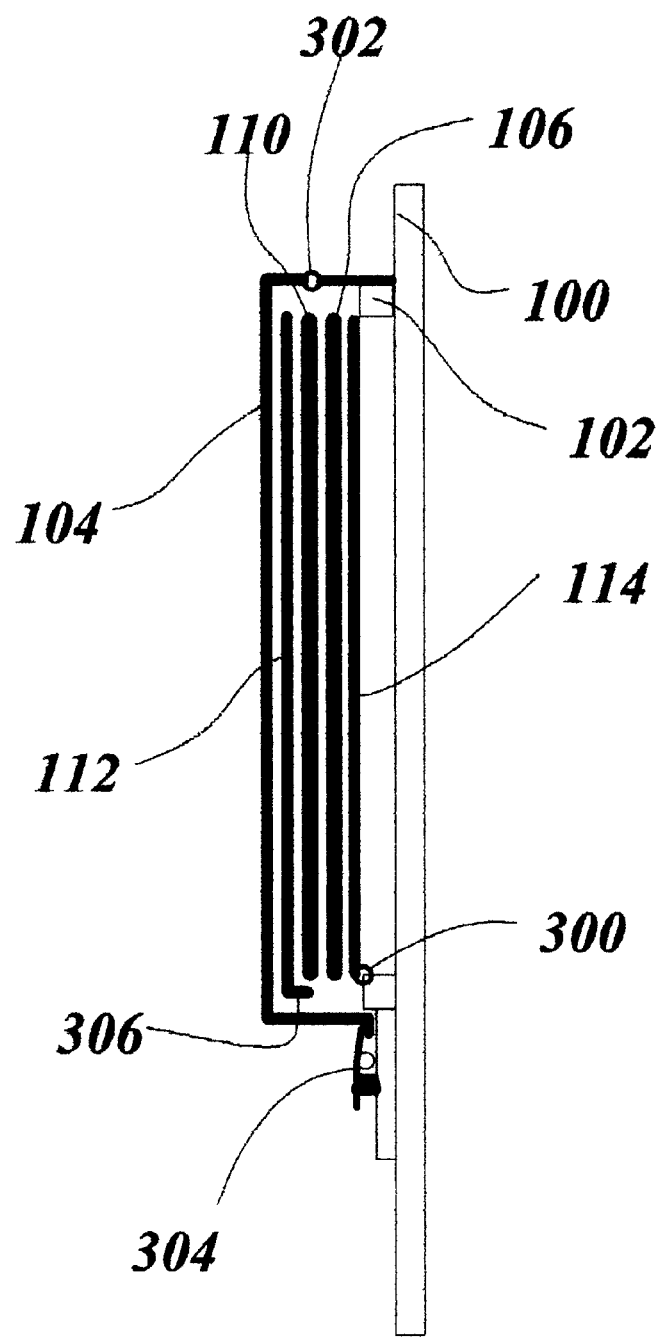
FIG. 3 is a side view of the invention in the stowed configuration showing the stack-up of panels.

In the stowed configuration the panels are then stacked-up flush to each other and the mounting wall (100) as shown in FIG. 3. FIG. 3 is a cross-sectional view of the invention from the side in the stowed configuration. The cross-section is taken to the right of the centerline, therefore we can see the right accordion side panels in the panel stack. Referring again to FIG. 3, the sequence of panels from the mounting wall (100) outward in the stowed configuration is: the floor panel (114), now folded up vertically, the right accordion side panel inner sub-panel (106), the right accordion side panel outer sub-panel (110), the outer panel (112), and the roof panel (104).

From this view, the cross-section of the hinge (300) connecting the floor panel (114) to the mounting frame (102) is visible. The hinge (302) connecting the roof panel (104) to the mounting frame (102) is also visible in cross-section. The roof panel is secured to the mounting wall (100) with a latch (304). The latch prevents the roof panel from being rotated up into its deployed configuration, thus securing all of the panels in the stowed configuration, substantially flush to the mounting wall. Alternatively, the latch can be made an integral part of the mounting frame. Also in FIG. 3 we can see the lip on the bottom edge of the outer panel (306). This lip extends inward towards the mounting wall. When the invention is in the deployed configuration, the lip acts to prevent the floor panel from rotating beyond a substantially perpendicular position.

In the stowed configuration, the panels are substantially flush to the mounting wall. If the mounting wall is the side of a recreational vehicle, travel trailer, mobile home, or hard-sided portion of a tent-trailer this allows the enclosure to be stowed in place, or self-storing, for travel. Travel is facilitated by having the enclosure stored substantially flush to the mounting wall, so that the width of the vehicle or trailer is not substantially extended by the installation of the invention.

To deploy the invention from the stowed configuration, the latch (304) is released and the roof panel (104) rotated up around its hinge (302) mounted along the top edge of the mounting frame (102). Once the roof panel has been rotated up to a position substantially perpendicular to the mounting wall (100), the outer panel (112) can be pulled out, away from the mounting wall. Pulling the outer panel away from the mounting wall unfolds the left and right accordion side panels. With the outer panel completely pulled out, the left and right accordion side panels are substantially flat, or completely unfolded, such the inner (106) and outer (110) sub-panels are coplanar. The floor panel (114) will then drop, or it can be pulled down, away from the mounting wall (100) to a position substantially perpendicular to the mounting wall. In the perpendicular position, the outer edge of the floor panel is caught on a lip (306) on the inside of the outer panel. This lip prevents the floor panel from rotating downward past the substantially perpendicular position.

Note that in the deployed configuration of FIG. 1, the roof panel (104) can be rotated up further, providing access to the enclosed volume from outside. This is used, for example, to provide a means for a pet owner to tend to the pet in the enclosure from outside the recreational vehicle, mobile home, travel-trailer, tent-trailer, or whatever object has the mounting wall (100) on which the invention is mounted.

Figure 4:
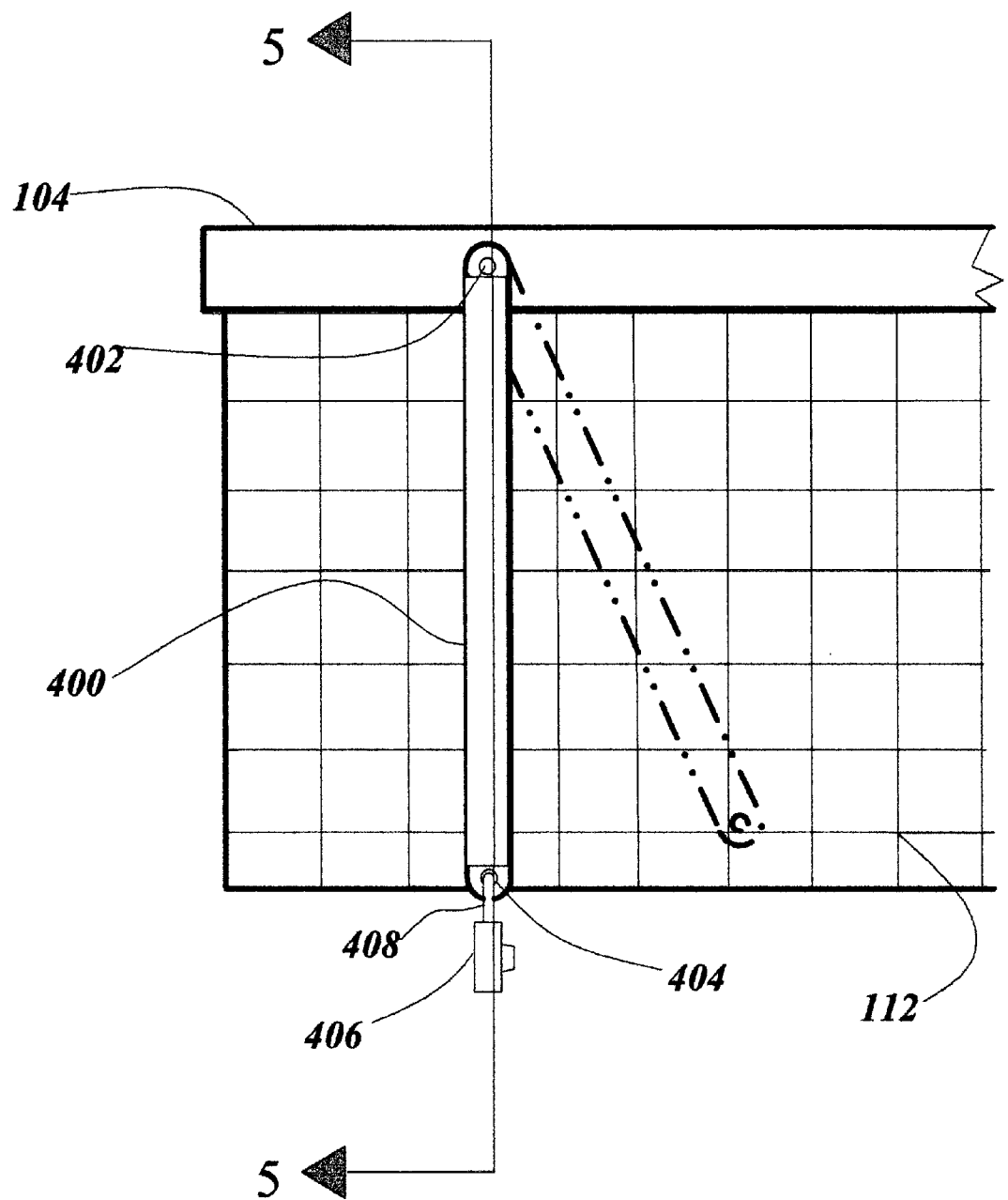
FIG. 4 is a front view of the enclosure showing the deployment of the locking bar.

In the preferred embodiment, the invention can be secured in the deployed configuration with a locking bar. The locking bar prevents accidental or malicious collapse into the stowed configuration while the enclosure is in use. The locking bar also prevents the roof panel from being rotated up, providing a means to control access to the interior of the enclosure from the outside. The locking bar (400), shown in FIG. 4, has an attached (402) and a free end (404). The attached end is rotatably connected to the outer edge of the roof panel as shown in FIG. 4. When engaged, the locking bar is swung down in front of the outer panel such that a hole in the free end of the locking bar is aligned with a hole in the bottom edge of the outer panel (112). The hasp (408) of a lock (406) is passed through the hole (404) in the unsecured end of the locking bar, through the hole in the bottom edge of the outer panel (500), and then through a third hole in the outer edge of the floor panel (502), as shown in FIG. 5.

Figure 5:
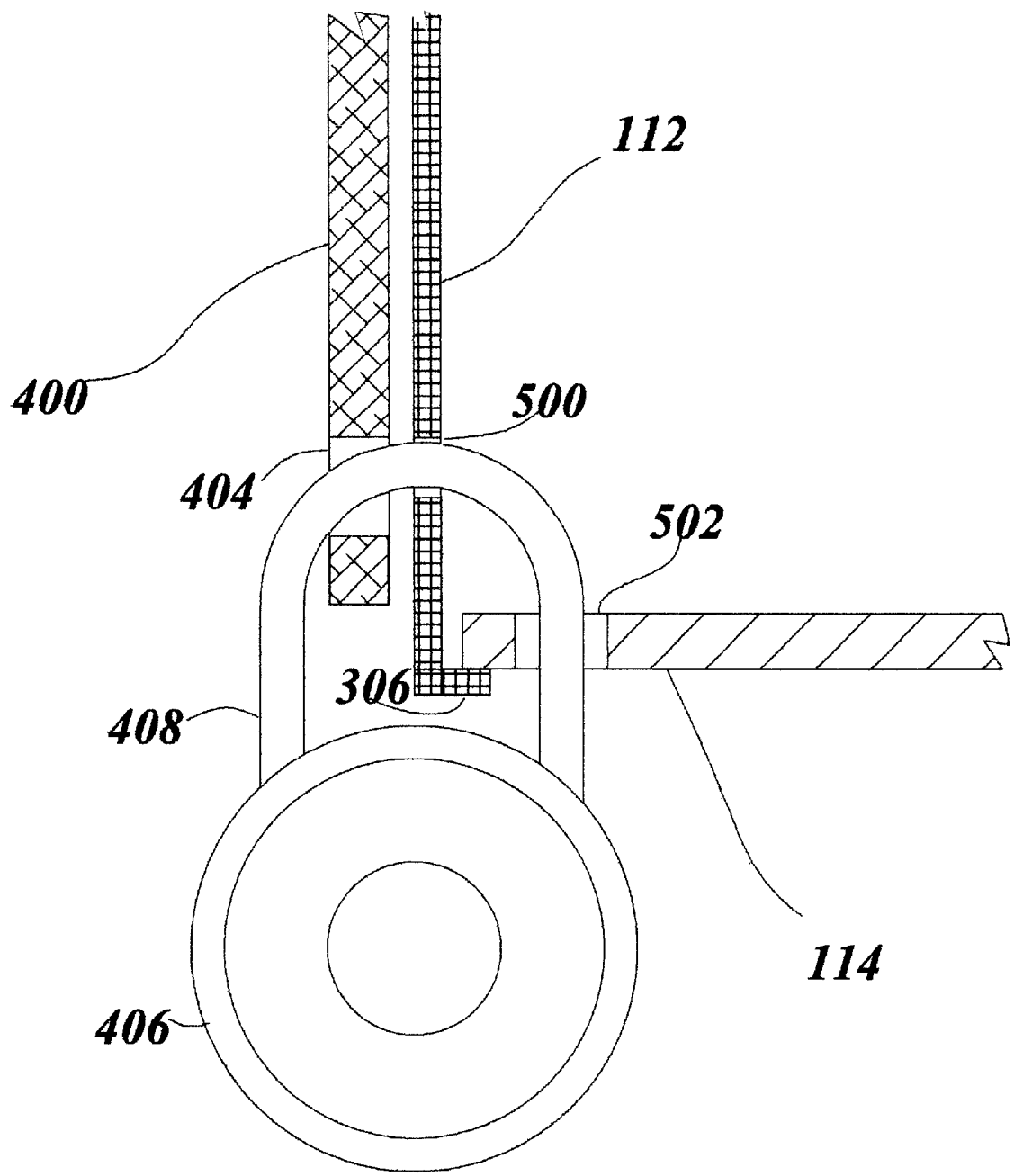
FIG. 5 is a cut-away side view showing the lock securing the locking bar.

In FIG. 5 it is clear that the hasp (408) of the lock (406) prevents the floor panel (114) from being rotated up away from the bottom edge of the outer panel (500). The lip (306) in the outer panel which prevents the floor panel from dropping beyond perpendicular is also clearly shown in FIG. 5. The locking bar (400) is also prevented from moving away from the bottom edge of the outer panel by the lock, thereby preventing the roof panel from being rotate up to give access to the interior of the enclosure. Since the outer panel cannot be pushed towards the mounting wall with the roof panel and floor panel secured by the locking bar, the accordion side panels are secured in their unfolded configuration. The locking bar, when engaged with a lock, therefore prevents access to the interior and collapse of the enclosure into the stowed configuration without first removing the lock.

The outer panel (112) is not directly connected to the mounting frame (102), the roof panel (104), or the floor panel (114). It is connected along each side edge to the accordion side panels. The outer sub-panel (122) of the left accordion side panel is connected to the outer panel (112) with a hinge (123) running vertically along the left edge of the outer panel. The outer sub-panel (110) of the right accordion side panel is connected to the outer panel (112) with a hinge (111) running vertically along the right edge of the outer panel.

I claim:

1. A self-storing enclosure for use on a mounting wall having a stowed and a deployed configuration, comprising:
   (a) a mounting frame attached to the mounting wall;
   (b) a roof panel rotatably attached to the frame;
   (c) a floor panel rotatably attached to the frame;
   (d) an outer panel;
   (e) a left and right accordion side panel, each having a vertical hinge which separates the accordion side panel into an inner sub-panel and an outer sub-panel, wherein the inner sub-panel is rotatably attached to the mounting frame, and the outer sub-panel rotatably attached to a side edge of the outer panel of the enclosure,
   (f) a locking bar which secures the self-storing enclosure in the deployed configuration having an attached end and a free end,
   wherein the attached end is rotatably attached to the outer edge of the roof panel and the free end has a hole through it that is aligned with a hole in the bottom edge of the outer panel in the deployed configuration,
   wherein the deployed configuration encloses a volume adjacent to the mounting wall and the stowed configuration is substantially flush with the mounting wall, and
   wherein the portion of the mounting wall covered by the enclosure in the stowed and deployed configurations is substantially the same.

2. The self-storing enclosure of claim 1 additionally comprising a latch which holds the outer edge of the roof panel to either the mounting wall or the mounting frame whereby the self-storing enclosure is secured in the stowed configuration.

3. The self-storing enclosure of claim 1 wherein the roof, floor, outer, and left and right accordion side panels are of wire-mesh, fiberglass, wood, sheet-metal, or plastic construction.

4. The self-storing enclosure of claim 1 wherein the roof, outer, and left and right accordion side panels are of wire-mesh construction and the floor panel is of sheet metal construction.

5. The self-storing enclosure of claim 1 wherein the mounting frame attached to the mounting wall encloses an opening in the mounting wall whereby access to the enclosure is possible.

6. The self-storing enclosure of claim 5 wherein the opening in the mounting wall is a pet door.

7. The self-storing enclosure of claim 5 wherein the opening in the mounting wall is a window.

8. A self-storing enclosure for use on a mounting wall having a stowed and deployed configuration, comprising:
   (a) a roof panel;
   (b) left and right accordion side panels;
   (c) a floor panel;
   (d) an outer panel;
   (e) a frame attached to a mounting wall;
   (f) a means for collapsing the self-storing enclosure into the stowed configuration,
   (g) a means for locking the self-storing enclosure in the deployed configuration
   wherein the deployed configuration encloses a volume adjacent to the mounting wall and the stowed configuration is substantially flush with the mounting wall,
   wherein the portion of the mounting wall covered by the enclosure in the stowed and deployed configurations is substantially the same, and
   wherein the floor panel is prevented from rotating when the self-storing enclosure is locked in the deployed configuration.

9. The self-storing enclosure of claim further comprising a means for latching the self-storing enclosure in the stowed configuration.

10. A method for deploying a self-storing enclosure attached to a mounting wall comprising the steps of:
   (a) rotating a roof panel up from a stowed position substantially flush with the mounting wall to a deployed position substantially perpendicular to the mounting wall;
   (b) pulling an outer panel from a stowed position parallel to and substantially flush with the mounting wall to a deployed position parallel to and away from the mounting wall whereby a left and right accordion side panel are unfolded;
   (c) rotating a floor panel down from a stowed position substantially flush with the mounting wall to a deployed position perpendicular to the mounting wall;
   (d) rotating a locking bar having an attached end and a free end, wherein the free end has a hole through it, from a stowed position parallel to and substantially flush with the outer edge of the roof panel to a deployed position substantially perpendicular to the outer panel such that the free end of the bar is adjacent to the outer edge of the floor panel;
   (e) securing the enclosure in a deployed configuration with a lock comprising a hasp wherein the hasp of the lock is inserted through a hole in the free end of the locking bar, a second hole near the bottom of the outer panel, and a third hole near the outer edge of the deployed floor panel whereby the floor panel cannot be raised into the stowed position and the roof panel cannot be rotated up from the perpendicular position without first removing the hasp of the lock.

* * * * *